United States Patent [19]

Hujik

[11] 4,090,831
[45] May 23, 1978

[54] APPARATUS FOR INJECTION OF A SOLE OF TWO MOLDABLE MATERIALS FOR AN ARTICLE OF FOOTWEAR

[75] Inventor: Ladislav Hujik, Batawa, Canada

[73] Assignee: Bata Shoe Co., Inc., Belcamp, Md.

[21] Appl. No.: 752,122

[22] Filed: Dec. 20, 1976

Related U.S. Application Data

[60] Continuation of Ser. No. 485,888, Jul. 5, 1975, abandoned, which is a division of Ser. No. 291,605, Sep. 25, 1972, abandoned.

[51] Int. Cl.² ............................................. B29F 1/12
[52] U.S. Cl. ................................. 425/119; 425/129 S; 425/130; 425/588
[58] Field of Search ...................... 425/119, 129 S, 130

[56] References Cited

U.S. PATENT DOCUMENTS

| | | | |
|---|---|---|---|
| 3,319,300 | 5/1967 | Hehl | 425/130 X |
| 3,474,496 | 10/1969 | Klee | 425/129 S X |
| 3,500,502 | 3/1970 | Santelmann | 425/129 S X |
| 3,555,609 | 1/1971 | Chu et al. | 425/129 S X |
| 3,671,621 | 6/1972 | Fukuoka | 425/129 S X |
| 3,682,579 | 8/1972 | Hujik | 425/129 S |
| 3,709,973 | 1/1973 | Maltby | 425/129 S X |
| 3,751,200 | 8/1973 | Borisuck | 425/129 S X |

FOREIGN PATENT DOCUMENTS

| | | | |
|---|---|---|---|
| 42-17586 | 9/1967 | Japan | 425/129 S |

Primary Examiner—J. Howard Flint, Jr.
Attorney, Agent, or Firm—Holman & Stern

[57] ABSTRACT

A two color shoe sole is molded onto a lasted upper by first molding the outer sole portion remote from the lasted upper, and then forming a mold cavity with the lasted upper and the outer sole portion to mold the inner sole portion, which interconnects the upper and outer sole portion. This facilitates the formation of profiled shoe soles, e.g., basketball shoes having ridges and grooves in their bottom surfaces.

5 Claims, 12 Drawing Figures

APPARATUS FOR INJECTION OF A SOLE OF TWO MOLDABLE MATERIALS FOR AN ARTICLE OF FOOTWEAR

This is a continuation of application Ser. No. 485,888, filed July 5, 1975 which in turn is Rule 60 Division of U.S. Ser. No. 291,605, filed Sept. 25, 1972, and now abandoned.

BACKGROUND OF THE INVENTION

This invention relates to apparatus for injection molding thermoplastic material, and in particular to molding two-colored soles onto shoes.

PRIOR TECHNIQUES

The injection molding of shoe soles onto the base of an upper mounted on a last, i.e., a lasted upper, has been practiced for some time. The sole of a conventional sport shoe, e.g., a basketball, or a so-called running shoe or sneaker includes two portions, namely an inner sole, which forms the top portion of the sole, i.e., the insole and a foxing strip extending around the periphery of the sole overlapping the bottom of the shoe upper and the second sole portion; and the second sole portion or outer sole, which forms the base of the sole and is inserted on the downwardly extending skirt defined by the foxing strip.

Normally, a shoe sole of the above-described type is molded of two differently colored portions of thermoplastic material, e.g., polyvinyl chloride. The inner sole is formed first in a mold cavity defined by a mold piston forming the bottom of the mold, side molds and the lasted upper, which closes the top of the mold. A first color thermoplastic material is injected into the mold cavity and, after a suitable cooling period during which the first color material solidifies, a new mold cavity is formed by moving the mold piston downwardly and a second color material is injected into the mold cavity to form the sole bottom or insert i.e., the outer sole.

The conventional apparatus for two-color molding suffers from the disadvantages that a long delay is required between the injection of the first and second color materials to permit solidification of the first color. If the first color material is not sufficiently solid, the second color material penetrates or passes through the first color material. However, even if the first color material is permitted to solidify completely, the thickness of both materials and the sole design are limited because of flow restriction during the second color injection. For example, if the sole portions are profiled, i.e., provided with ridges and grooves, the second color material entering the mold cavity tends to deform the ridges formed on the first color material during the first injection step, if the first color material is not sufficiently cured.

Thus, it is seen that the conventional two-color injection apparatus is unsatisfactory in that the time required for molding is lengthy, and possibly the quality, i.e., appearance of the finished product, may be poor.

OBJECTS AND SUMMARY OF THE INVENTION

The object of the present invention is to overcome or at least partly obviate the above disadvantages by providing a relatively quick two-color molding apparatus which results in a relatively high quality finished product.

Accordingly, the present invention provides an apparatus for forming a sole of two moldable materials for an article of footwear on a lasted upper, the sole including an inner sole portion and an outer portion, said apparatus comprising first mold means defining first a mold cavity for molding said outer sole portion, said first mold means including a mold cylinder, a mold piston reciprocably mounted in said cylinder for movement between mold closing and mold opening positions, first mold sides for movement between said mold closing and mold opening positions and a mold top for movement between said mold closing and mold opening positions, said mold top including a bottom surface having substantially the same shape as a last bottom, whereby the first mold cavity is formed for receiving a first moldable material for molding said outer sole portion onto said mold piston; and second mold means for defining a second mold cavity for molding said inner sole portion, said second mold means including said mold piston and said outer sole portion, second mold sides and a lasted upper.

The invention will now be defined in greater detail, with reference to the accompanying drawings, wherein:

DETAILED DESCRIPTION OF THE INVENTION

Figure 1:
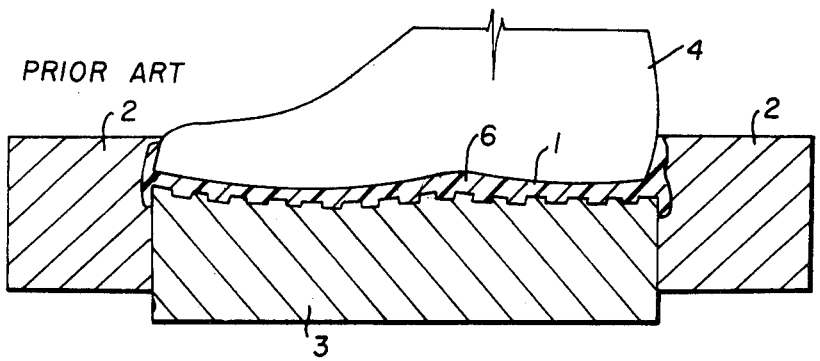
FIGS. 1 and 2 are schematic cross-sectional views of a mold used in a conventional two-color molding method.
Figure 2:
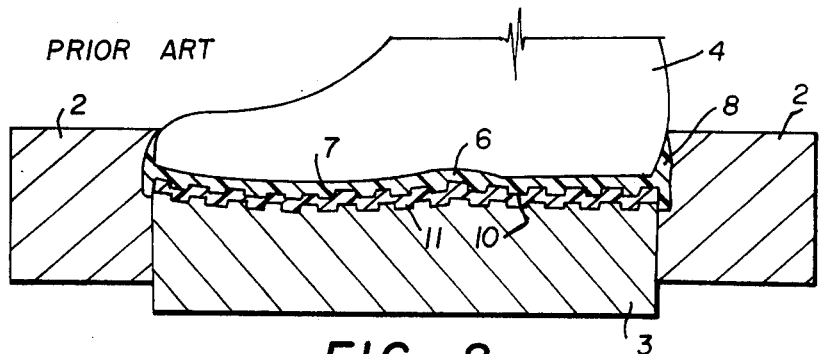
Figure 3:
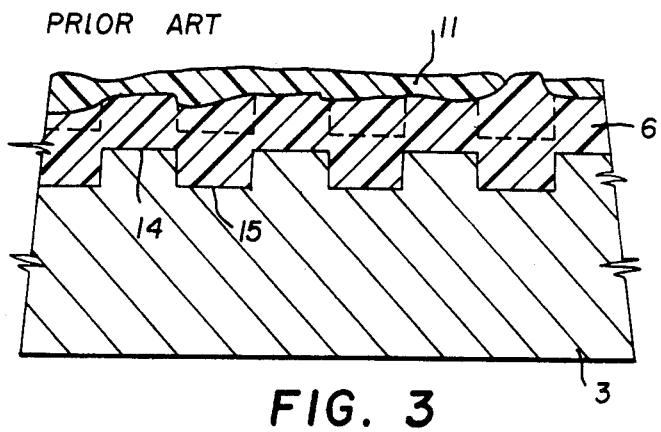
FIG. 3 is a schematic cross-sectional view of a portion of a shoe sole molded according to the conventional two-color injection molding technique.

With reference to FIGS. 1 and 2, the conventional method of injection molding a two-color shoe sole includes the steps of forming a mold cavity 1 with side molds 2, a vertically movable mold piston 3 and a lasted upper 4. The mold cavity 1 thus formed is filled during a first molding step with a first color or inner sole portion 6, which forms an insole 7 and a foxing strip 8 of the finished shoe. The inner sole portion 6 is cooled, i.e., partially cured, and then a new mold cavity is formed by moving the mold pistons 3 downwardly. In a second molding step (FIG. 2), a new or enlarged mold cavity 10 is filled with a second color for outer sole portion 11, which forms the base of the finished sole.

The method described with reference to FIGS. 1 and 2, is intended for producing a profiled sole using a single mold piston 3 including a profiled upper surface provided with ridges 14 having grooves 15 therebetween. If the inner sole portion 6 is not sufficiently solidified when the outer sole portion is being injected into the mold cavity 10, the ridges are distorted by hot, liquid thermoplastic material flowing into the mold cavity 10 to form the outer sole portion 11. Moreover, flow of the second color material into the mold cavity 10 is restricted by the ridges 14 and those in the inner sole portion 6. Finally, if the thermoplastic material forming the inner sole portion 6 is insufficiently cured, the second color material may pass through the first color material, thus forming an unsightly finished product.

Figure 4:
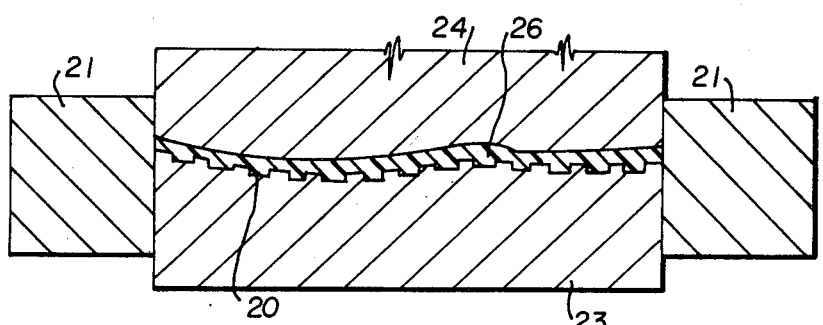
FIGS. 4 and 5 are schematic cross-sectional views of the molds used for the two-color molding of the present invention.
Figure 5:
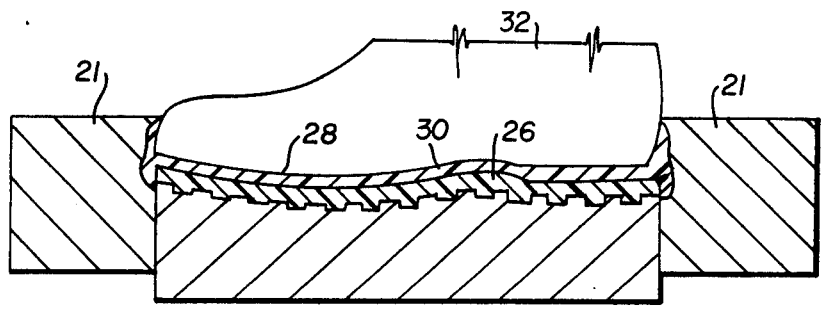

Referring now to FIGS. 4 and 5, the present invention utilizes a mold cavity 20 formed by side molds 21, a vertically movable mold piston 23 and a top mold 24. The only difference between the two methods is that an outer sole portion 26 is formed first in the mold cavity 20 and, after curing of the sole portion 26, a new mold cavity 28 is formed to receive a second color for providing an inner sole portion 30. With the prior art method described above, ridges are necessarily formed on the inner sole portion 6, since in order to produce ridges on the outer sole portion 11 when using one mold piston 3, the latter most have a profiled upper surface with ridges 14 and grooves 15. By changing the order of molding, the ridges occur on the base of the outer sole portion 26, and the flow problem referred to herein before does not arise.

In forming the mold cavity 20, it must be remembered that the outer sole portion 26 is not molded to the base of a lasted upper. Accordingly, the top of the mold cavity 20 is closed by a top mold 24, e.g., a dummy last, the bottom surface of which has a configuration similar to that of a shoe insole.

Figure 6:
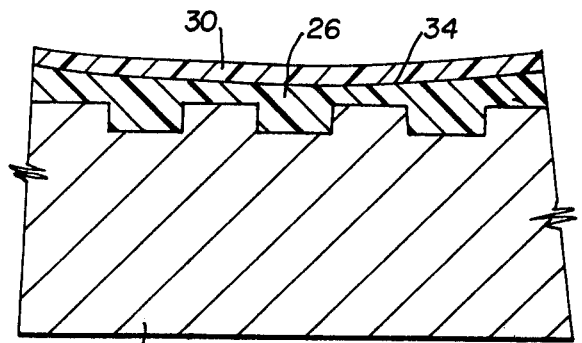
FIG. 6 is an enlarged schematic cross-sectional view of a portion of a shoe sole molded in accordance with the present invention.

In order to form the second mold cavity 28, the top mold portion is replaced by a lasted upper 32, which cooperates with the side molds 21 and the mold piston 23 in forming such second mold cavity. Thus, the outer sole portion 26 is molded first, and then the inner sole portion 30 is molded between the lasted upper 32 and the outer sole portion 26. The thermoplastic material flowing into the mold cavity 28 to form the inner sole portion encounters no resistance, since the top surface 34 (FIG. 6) of the outer sole portion 26 is smooth. Thus, the possibility of an unsightly finished product is reduced, as is the time required for molding.

Figure 7:
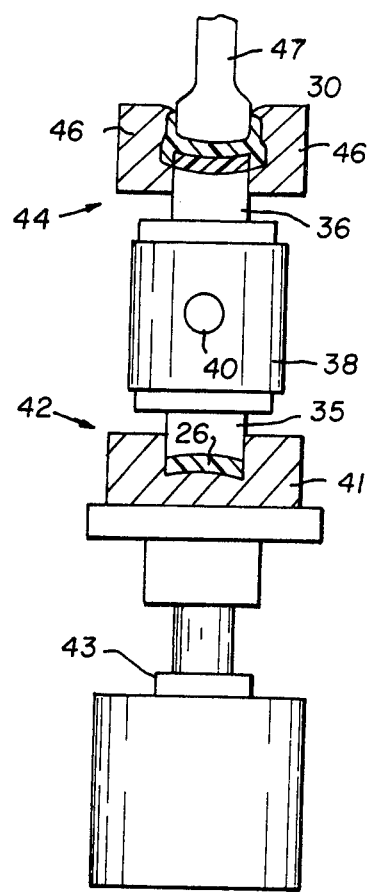
FIGS. 7 and 8 are schematic, partly sectioned end views of an apparatus of the present invention.
Figure 8:
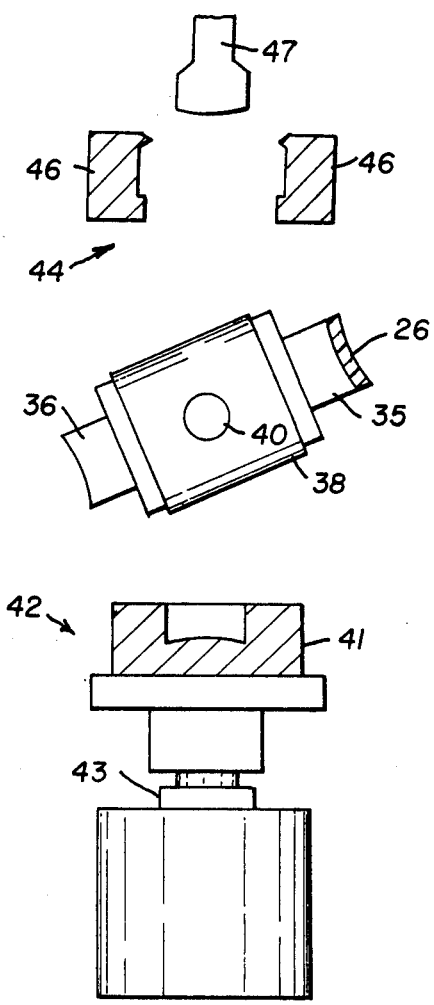

A suitable apparatus for performing the present invention is shown in FIGS. 7 and 8, and incudes a pair of mold pistons 35 and 36 slidably mounted in a pneumatic cylinder 38. The cylinder 38 is pivotally mounted for rotation about a horizontal axis defined by a shaft 40. In the first molding step, i.e., the molding of the outer sole portion 26, one mold piston 35 cooperates with a lower mold 41 for forming the mold cavity 20 at a first molding station 42. The lower mold 41 is mounted on the upper end of a piston and cylinder arrangement 43, whereby the lower mold 41 can be moved from the molding position shown in FIG. 7 to a lower position (FIG. 8) to permit rotation of the cylinder 38 and mold pistons 35 and 36 with the shaft 40.

After the outer sole portion 26 has been molded, the lower mold 41 is moved downwardly and the cylinder 38 is rotated to move the mold piston 35 to a second molding station, generally indicated at 44. At the second molding station 44, the second mold cavity 28 is formed for molding the inner sole portion 30. The second mold cavity is defined by the outer sole portion 26 on the piston 35, side molds 46 and a lasted upper 47.

While effecting the second molding step at the second molding station 44, a new first molding step is being performed at the first molding station 42. Thus, after the first molding operation at molding station 42, the method can be carried out continuously, with simultaneous formation of first and second sole portions at different molding stations. Upon completion of the second molding step at molding station 44, the second mold is opened (FIG. 8), and the lasted upper is moved upwardly for removal of the lasted upper and sole formed thereon.

Figure 9:
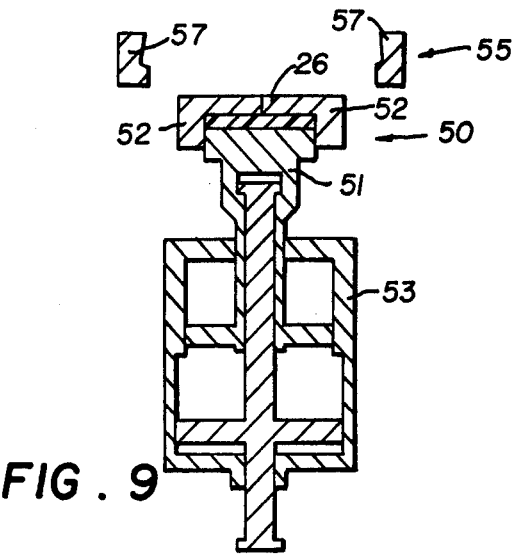
FIGS. 9 to 12 are schematic, cross-sectional end views of other forms of apparatus of the present invention.
Figure 10:
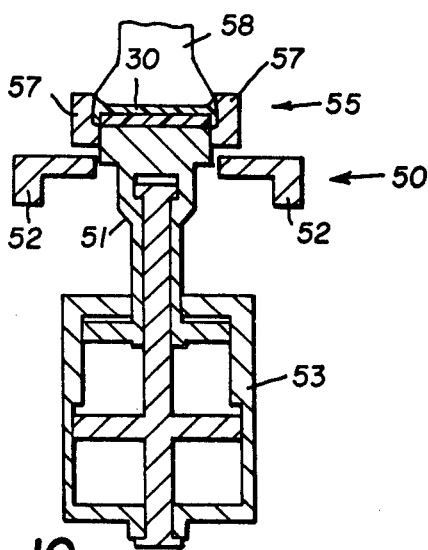

Another form of apparatus for carrying out the present invention is shown in FIGS. 9 and 10. In the apparatus of FIGS. 9 and 10, a first color thermoplastic material is molded at a first molding station 50 to form an outer sole portion 26a in a mold cavity defined by a mold piston 51 and side molds 52, which form the sides and top of the mold cavity. The piston 51 is slidably mounted in a cylinder 53 for moving the piston 51 vertically from the first molding station 50 to a second molding station 55 where the second color thermoplastic material, i.e., inner sole portion 30a is molded onto a lasted upper 58 (FIG. 10). After molding of the outer sole portion 26a, the side molds 52 are opened and the piston 51 is moved upwardly to the second molding station 55 where side molds 57 and the lasted upper 58 are moved into position to form a second mold cavity for molding the inner sole portion 30a.

Figure 11:
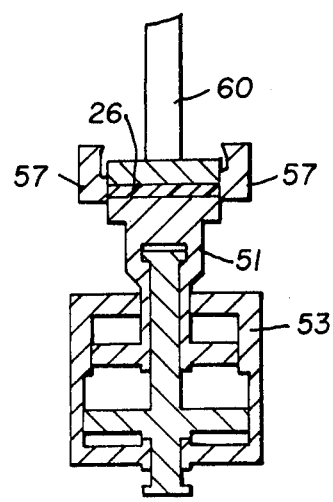
Figure 12:
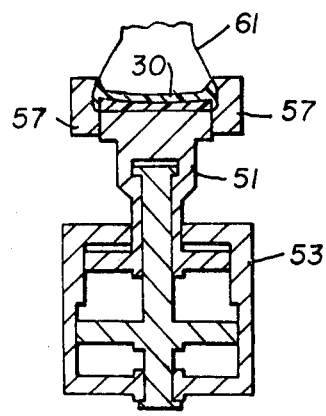

The apparatus of FIGS. 11 and 12 is identical to that of FIGS. 9 and 10, except the special side molds 51 are replaced by conventional side molds 58 and a dummy last 60 is used to close the top of the mold cavity in the molding of the outer sole portion 26a. Thus, the two molding stations are in one location and, after molding of the outer sole portion 26a, the only actions required are replacement of the dummy last 60 with a lasted upper 61, and upward movement of the mold piston 51. The dummy last 60 and lasted upper 61 could be mounted on piston rods in a common rotatable cylinder, whereby, after the first molding operation, the dummy last 60 can be removed from the opened mold, the cylinder rotated and the last upper inserted between the side molds 57.

It will be appreciated that the various apparatus of the present invention could be incorporated in a turntable having stations for lasting an upper, molding the outer sole portion, molding the inner sole portion and unloading. In other words, the present invention is readily adaptable to a continuous, cyclical operation, and, depending on the number of stations, a large number of shoe soles can be formed relatively quickly.

I claim:

1. An apparatus for forming a sole of two moldable materials for an article of footwear on a lasted upper, the sole including an outer sole portion and an inner sole portion defining an insole on said outer sole portion and a foxing strip surrounding the side edges of said outer sole portion and overlapping the bottom side edges of the upper, said apparatus comprising first mold means defining a first mold cavity for molding said outer sole portion, said first mold means including a mold cylinder, a mold piston reciprocably mounted in said cylinder for vertical movement between mold closing and mold opening positions, said mold piston having an outer surface with substantially the same peripheral shape as said outer sole portion, first mold sides, and a mold top for vertical movement between said mold closing and mold opening positions, said mold top including a bottom surface having substantially the same shape as a last bottom, whereby the first mold cavity is formed for receiving a first moldable material for molding said outer sole portion onto said mold piston; and a second mold means for defining a second mold cavity for molding said inner sole portion; said second mold means including said mold piston and said outer sole portion, second mold sides laterally movable between mold closing and mold opening positions, and a lasted upper vertically movable between mold closing and mold opening positions, said outer sole portion, second mold sides and lasted upper defining the second mold cavity above and surrounding the side edges of said outer sole portion for forming an insole on said outer sole portion and a foxing strip surrounding the side edges of the outer sole portion and overlapping the bottom side edges of the upper.

2. The apparatus according to claim 1, wherein said first mold top is integral with said first mold sides, said first top and sides being laterally movable between mold closing and mold opening positions, and said second mold sides are disposed immediately above said first mold sides.

3. The apparatus according to claim 1, wherein said first mold top is integral with said first mold sides.

4. The apparatus according to claim 1, wherein said first and second mold sides are formed by the same elements, and said first mold top is a dummy last.

5. The apparatus according to claim 4, including first and second piston rods supporting said dummy last and said lasted upper, respectively; and a rotatable cylinder in which said piston rods are reciprocably mounted, whereby, upon completion of the molding of said outer sole portion and opening of said first mold cavity, said cylinder may be rotated to position said lasted upper above said outer sole portion for forming said second mold cavity.

* * * * *